United States Patent
Mills et al.

(10) Patent No.: US 6,866,121 B2
(45) Date of Patent: *Mar. 15, 2005

(54) METHOD AND APPARATUS FOR TESTING FLOW AND FLUSHING A TRANSMISSION COOLING SYSTEM

(75) Inventors: Richard Mills, LaPorte, IN (US); Walter Murray, Pioneer, OH (US); Daniel J. Popoff, Canton, MI (US)

(73) Assignee: SPX Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/138,518

(22) Filed: May 6, 2002

(65) Prior Publication Data

US 2003/0205432 A1 Nov. 6, 2003

(51) Int. Cl.⁷ .............................................. F16C 3/14
(52) U.S. Cl. ............................................ 184/1.5; 184/6
(58) Field of Search ....................................... 184/1.5, 6

(56) References Cited

U.S. PATENT DOCUMENTS

| | | | | | |
|---|---|---|---|---|---|
| 3,513,941 | A | * | 5/1970 | Becnel ........................ | 184/1.5 |
| 4,951,784 | A | * | 8/1990 | Bedi ........................... | 184/1.5 |
| 5,015,301 | A | * | 5/1991 | Baylor et al. ............... | 134/22.1 |
| 5,427,202 | A | * | 6/1995 | Behring et al. ............. | 184/1.5 |
| 5,495,917 | A | * | 3/1996 | Pax .............................. | 184/6 |
| 6,253,805 | B1 | * | 7/2001 | Erwin et al. ................ | 184/1.5 |
| 6,330,934 | B1 | * | 12/2001 | Viken .......................... | 184/1.5 |
| 6,374,872 | B1 | * | 4/2002 | Tarabocchia ................ | 184/1.5 |
| 2003/0213309 | A1 | * | 11/2003 | Mills et al. .................. | 73/861 |

* cited by examiner

*Primary Examiner*—David A. Bucci
*Assistant Examiner*—Bradley J. Van Pelt
(74) *Attorney, Agent, or Firm*—Baker & Hostetler LLP

(57) ABSTRACT

Method and apparatus provided to accurately test flow and flush cooling systems.

25 Claims, 3 Drawing Sheets

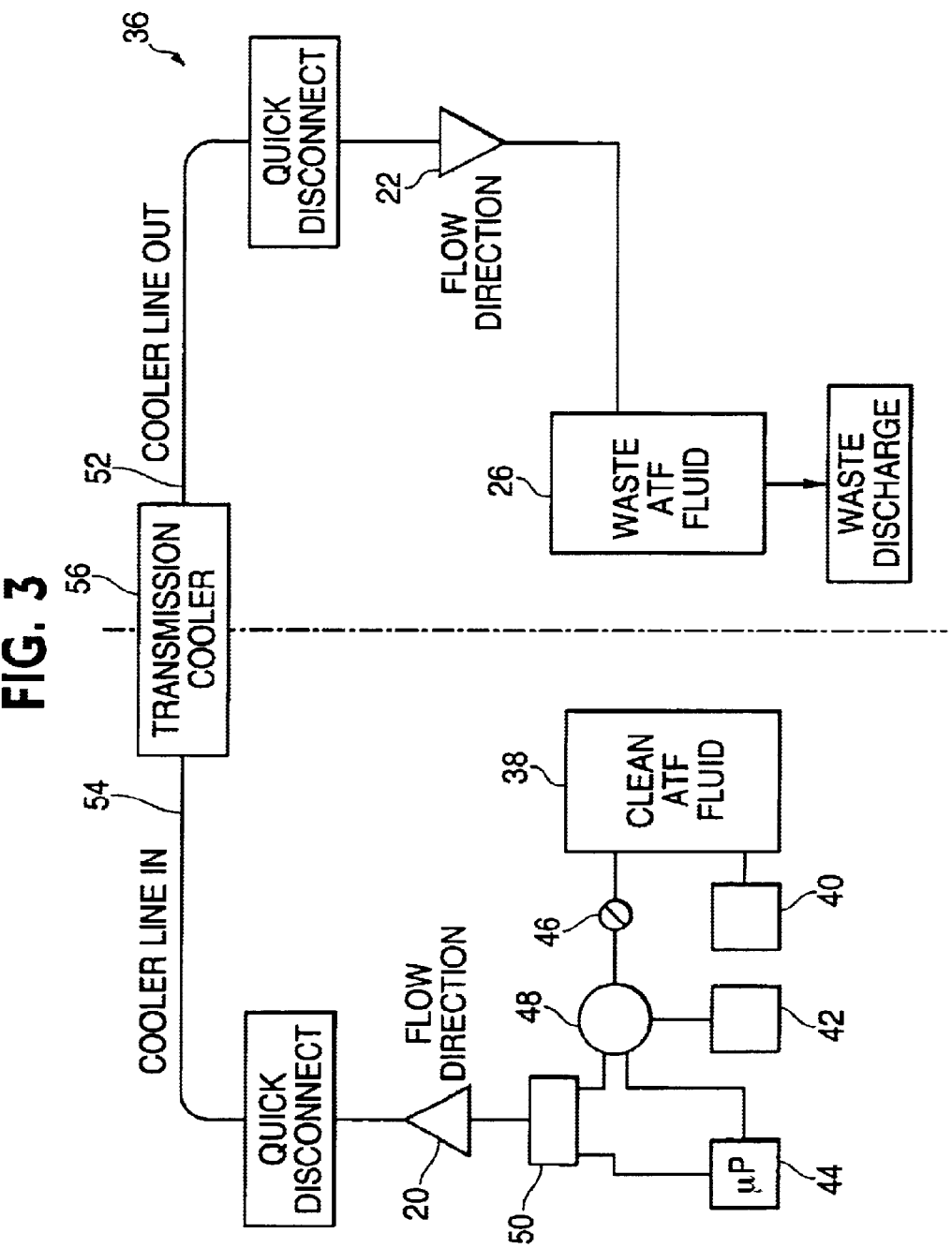

US 6,866,121 B2

METHOD AND APPARATUS FOR TESTING FLOW AND FLUSHING A TRANSMISSION COOLING SYSTEM

FIELD OF THE INVENTION

The present invention relates generally to the field of flushing cooling systems. More particularly, the present invention relates to a method for testing fluid flow and flushing transmission cooling systems and a transmission cooling system flow tester device.

BACKGROUND OF THE INVENTION

Many consumer and industrial vehicles use automatic transmissions filled with automatic transmission fluid (ATF) as the working fluid and to aid in cooling the transmission. In typical configurations, automatic transmissions are equipped with a cooling system, such as an oil cooler, that may be located, for instance, inside an automobile radiator. The automatic transmission fluid is cycled through the oil cooler to regulate its temperature and then back into the transmission in order to keep the transmission cool.

The importance of maintaining fresh and clean transmission fluid is essential in keeping the transmission cool. At regular intervals, the automatic transmission fluid should be removed from the transmission and replaced with fresh fluid as the fluid properties degrade with time and in use. Entrained contaminants and debris, not fully removed by the transmission's filter assembly, can clog the oil cooler, the result of which is that proper ATF flow through the oil cooler and to the transmission is prevented. Improper ATF flow can cause the transmission to overheat and produce serious, if not, permanent damage.

In instances where a transmission is replaced, it is important to test the ATF flow through a reused oil cooler which is reconnected to the new transmission. This is to ensure that no debris from the replaced transmission was transferred into the reconnected oil cooler during its original use. Such debris can prohibit fluid flow to the newly installed transmission once the entire system is reconnected. If fluid flow is prohibited by any debris within the oil cooler, the efficiency of providing thermal dissipation to the circulating fluid is greatly inhibited. Thus, a newly installed transmission will not be properly cooled due to a combination of the lack of fluid it receives from the blocked oil cooler or the improperly maintained temperature regulation of the fluid being received from the cooler. The result, of which, ruins the newly installed transmission due to overheating.

A need still exists, therefore, for an evaluation of fluid flow to the cooling system which identifies whether the fluid is continuously flowing properly. A need further exists for a flushing step that agitates the fluid in order to break loose any debris within the oil cooler and effectively cleans the cooling system in an efficient manner.

SUMMARY OF THE INVENTION

The foregoing need has been met by the present invention, whereby in one aspect of the invention, a method is provided to test flow and flush a cooling system. The method includes pressurizing transmission fluid to create fluid flow and regulating the fluid flow direction through a fluid control system. A fluid flow rate measurement is ascertained in order to determine whether the fluid is flowing at a proper rate. If the fluid flow rate is inadequate, turbulence is added to the fluid flow, and the cooling system is flushed by the fluid in a flow direction through the cooling system. The flushing action aids in removing either old and dirty transmission fluid or debris within the oil cooler and allows circulation of new ATF within the cavities of the oil cooler. This effect provides optimal thermal dissipation of the clean ATF for subsequent circulation through the transmission, thus, providing proper cooling.

In another aspect of the invention, the method further includes reversing the flow direction through the cooling system after performing an initial flow check and flushing operation. After the initial operation, the invention provides pressurized transmission fluid to create fluid flow and regulates the fluid flow direction through a fluid control system. In order to determine whether the fluid is flowing at a proper rate, a fluid flow rate measurement is, again, ascertained in order to determine whether the fluid is flowing properly. If the flow rate is improper, turbulence is added to the fluid flow to remove any debris restricting proper fluid flow within the oil cooler. The cooling system is then flushed by the fluid in reverse to the original flow direction through the cooling system. By measuring the fluid flow rate and providing additional flushing in the reverse flow direction, a more accurate assessment can be made with regards to determining whether a reused oil cooler is capable of functioning properly during operation.

In another aspect of the invention, a cooling system flow testing and flushing device is provided including a means for pressurizing fluid to create a fluid flow. The course of the flow is controlled by a means for regulating a direction of the fluid flow through a flow control system. The invention further includes a means for measuring a fluid flow rate which is utilized to determine whether the fluid is flowing properly. If it is determined that flow is being restricted, a means for adding turbulence to the fluid flow is operated to remove any debris restricting proper flow rates within the oil cooler. A means for flushing the cooling system in a flow direction cycles the pressurized fluid through the cooling system.

In another aspect of the invention, a cooling system flow testing and flushing device is further provided to include a means for reversing the flow direction through the cooling system after performing an initial flow check and flushing operation. Once accomplished, a means for pressurizing fluid to create a fluid flow is provided. The course of the flow is controlled by a means for regulating a direction of the fluid flow through a flow control system. A means for measuring a fluid flow rate is provided to determine whether the fluid is flowing properly. If the fluid is not flowing properly, a means for adding turbulence to the fluid flow is provided in order to eliminate clogged debris within the oil cooler. Furthermore, a means for flushing the cooling system in reverse to the original flow direction is utilized to cycle the pressurized fluid through the cooling system.

In another aspect of the invention, a cooling system flow testing and flushing apparatus is provided including a fluid supply tank connected to a controlled air pressure system. The supply tank provides fluid to flush the cooling system as the fluid is pressurized to generate a fluid flow through a connected fluid supply line and into the cooling system. A check valve is coupled to the supply line to regulates the directional flow of the fluid. A flow transducer is utilized to measure the rate of fluid flow and sends the fluid rate measurements to a processor. The processor is further operable to control a solenoid which is also coupled to the supply line. The solenoid is operable to regulate the introduction of compressed air into the fluid flow in order to generate fluid turbulence. Similarly, this turbulence loosens any debris within the cooling system during the fluid flushing process. Flushed fluid from the cooling system is directed through the apparatus' fluid return line into a connected waste receptacle tank.

There has thus been outlined, rather broadly, the more important features of the invention in order that the detailed description thereof that follows may be better understood, and in order that the present contribution to the art may be better appreciated. There are, of course, additional features of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

BRIEF DESCRIPTION OF THE DRAWINGS

FIG. 3 is a block diagram of the connection of the feed hoses during the flushing operation of the flushing cooling system of FIG. 1.

DETAILED DESCRIPTION OF THE INVENTION

Figure 1:
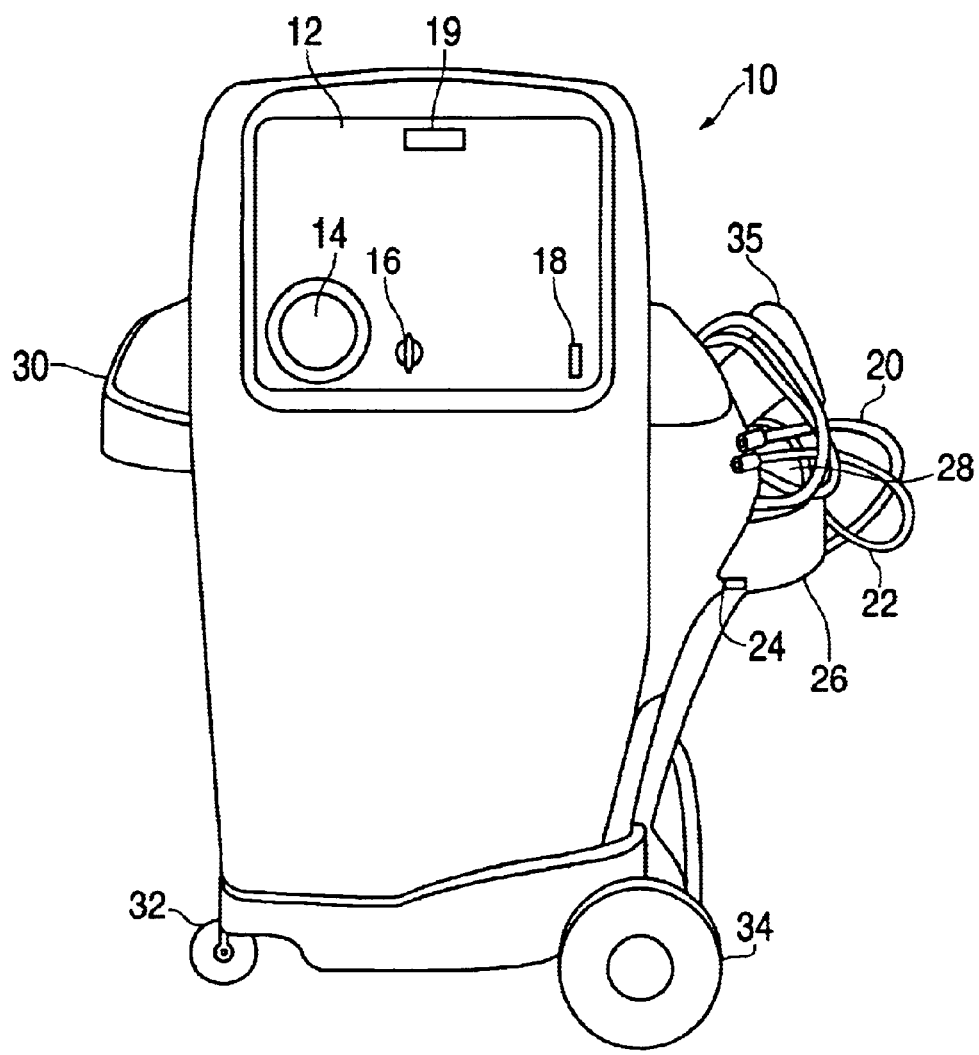
FIG. 1 is a perspective view of the front of a flushing cooling system in accordance with a preferred embodiment of the present invention.

The present invention provides an apparatus, as depicted in FIG. 1, for testing flow to a cooling system and/or a transmission, flushing the cooling system or exchanging transmission fluid. The device 10 is preferably comprised of a stamp steel skeleton with a plastic exterior shell. The interface 12 allows an operator to set the device for performing a variety of functions by selecting an operating mode. The selected mode allows the device to perform one of either a fluid flow testing operation, a cooling system flushing operation, or a fluid exchange operation.

In the flow testing mode, the apparatus acts as a flow diagnostic machine by determining whether fluid flowing from an independent source is properly flowing through a cooling system. In the flushing mode, the apparatus provides turbulence to the fluid flow and performs a flushing operation. In the exchange mode, the apparatus compares flow entering and leaving a transmission and adjusts the rate of flow accordingly as it simultaneously exchanges old ATF with clean ATF.

In operation, an operator fills the device with fluid through the fill port 14. An operating mode is selected by setting the knob selector 16 and the device is powered on by switch 18. An LED display 19 exhibits information such as fluid flow rate, transmission fluid temperature, low battery indicator for an insufficiently charged 12 volt supply source (not shown), incorrect hook-up warning, and fluid level in the supply tank.

As further shown in FIG. 1, external quick disconnect fluid hoses 20, 22 are available for connecting to a cooler system or in combination with a transmission system depending upon the selected operating mode. In a preferred embodiment of the invention, typically, one hose 20 serves as a clean ATF supply line connecting to a cooling system, e.g., an oil cooler. The other hose 22 serves as an ATF return line back into the device to direct discharged ATF into a waste receptacle 26. An external compressed air supply source (not shown) is connected to an air intake fitting 24. Trays 28, 30 provide convenient storage containers for tools and equipment. The entire device 10 is portable and maneuverable by attached wheels 32, 34 and handle 35.

Figure 2:
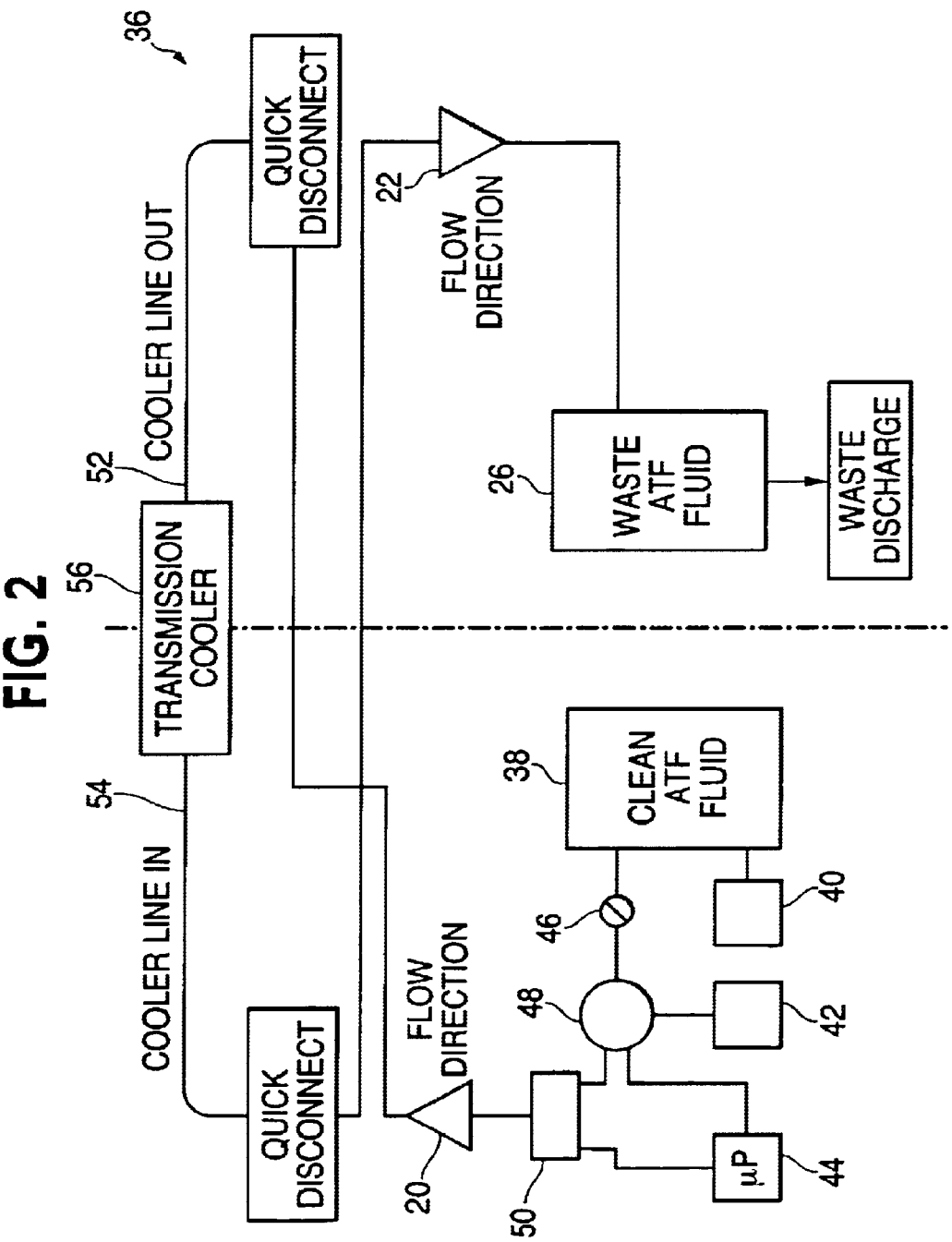
FIG. 2 is a block diagram of the connection of the feed hoses during setup of the flushing cooling system of FIG. 1.

Referring now to FIG. 2 an illustrative set-up connection is depicted for performing the method of a preferred embodiment of the invention. As shown, a block diagram 36 of the device for initially testing flow and flushing the transmission cooler 56 is depicted. Compressed air 40 is provided by an external source to supply air through the air intake fitting 24, FIG. 1, into a steel supply tank 38. The tank also receives ATF from the fill port 14. The supply line hose 20 is connected to the tank and delivers ATF to the cooling system 56. Coupled to the supply line hose 20 is a check valve 46 and a solenoid 48. Compressed air 42 is also supplied to the solenoid in operation as described below. A flow transducer 50 is attached to either the supply line hose 20 (as shown in FIGS. 2–3) or the return line hose 22. Processor 44 is connected to both the flow transducer 50 and solenoid 48.

During initial setup, the source of clean ATF is connected to the supply line hose 20 of the device, and the supply line hose is hooked into the line out side 52 of the cooling system 56. The line in side 54 of the cooling system 56 is initially hooked into return line hose 22 of the device 10. Connected in this way, used ATF fluid in the cooling system 56 is flushed into the waste receptacle 26.

In this set-up, the flow testing and flushing process is originally provided in a reverse direction to the normal direction of fluid flow in the cooling system. An advantage of testing flow and flushing in this manner is that any trapped debris is more easily dislodged by the flushing fluid within the chamber of the cooling system.

In operation, compressed air is supplied to the device which pressurizes the ATF in the supply tank to generate a fluid flow. As will now be discussed, the device performs a flow test procedure prior to performing a flushing operation in order to determine how well fluid is flowing through the cooling system. In this process, the flow transducer 50 monitors the fluid flow rate. During the flow test, processor 44 receives information corresponding to fluid flow rate measurements taken by the flow transducer 50. The processor also relays the fluid flow rate measurement values to the LED display 19 for an operator to read. Additionally, the processor is further operable to control solenoid 48 which is coupled to both the transducer and check valve.

Based upon the displayed measurements, an operator can determine whether the fluid flow rate for the cooling system 56 is too low and decide to perform a flushing operation in an attempt to increase the fluid flow rate to an acceptable level. To perform the flushing operation, the operator sets the knob selector 16 to flush mode. In flush mode, the processor 44 signals the solenoid 48 to pulse compressed air 42 into the fluid flow stream at a higher pressure than the compressed air 40 provided through the air intake fitting 24. The flushing process is useful for clearing blockages within the cooling system caused, for instance, by debris.

Trapped debris within the cooling system is one cause of diminished flow rates. Such debris will ultimately cause fluid flow backup within the flow control system, in-effect, generating the reduced fluid flow rate. Left un-removed, the cooling system debris will cause a reassembled transmission system to overheat as a result of fluid flow back-up and, hence, improper cooling of the transmission system.

The effect of introducing compressed air pulses creates turbulence to the fluid flow stream. The added turbulence has a tendency to alter the fluid flow direction, however, the check valve 46 ensures that the direction of fluid flow remains proper. The continuous bombardment of fluid turbulence against the debris gradually breaks it loose from the inner surfaces of the cooling system. By requiring the pressure of compressed air 42 to be higher than that of the compressed air 40, the turbulence effect is better generated to eradicate any trapped debris. Once removed, the debris is carried away by the cycling fluid for disposal into the waste receptacle 26 through connected return hose 22.

As the debris is removed, the flow rate increases to a normal level for the cooling system. The operator may verify acceptable fluid flow rate levels by re-setting the knob selector 16 to the flow mode. The device will measure the fluid flow rate for the operator to ensure that the flow rate is either acceptable or that additional flushing needs to be performed.

In order to fully determine whether the cooling system is in operable condition, the device's supply hose 20 and return line hose 22 are disconnected from the system. These hoses are reassembled to the cooling system in reverse order to generate reverse fluid flow during flushing of the cooling system. As shown in FIG. 3, the device's supply hose 20 is connected to the cooling system's line in side 54. Additionally, the device's return line 22 is connected to the cooling system's line out side 52. Fluid within the supply tank is, again, pressurized to generate fluid flow. The entire process of monitoring the fluid flow rate and flushing the cooling system may be repeated.

In general, the fluid flow rate in forward direction through the cooling system will be higher than the measurements taken during the set-up process as described above in connection with FIG. 2. This is directly attributed to unclogging the cooling system in the original set-up which allows increased fluid flow throughout the interior of the cooling system.

The fluid flow rate data from the original set-up procedure and the fluid flow rate data from the forward fluid flow procedure provides sufficient information to make an educated assessment of the performance integrity of the cooling system. Additionally, cooling systems subjected to the flow test procedures and flushing processes of the current invention are more fully flushed than those flushed under other prior art applications.

The many features and advantages of the invention are apparent from the detailed specification, and thus, it is intended by the appended claims to cover all such features and advantages of the invention which fall within the true spirits and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed:

1. A method of testing flow and flushing a cooling system comprising:

pressurizing a fluid to create a fluid flow into the cooling system;

regulating a direction of the fluid flow through a flow control system;

measuring a fluid flow rate to determine if the cooling system is clogged;

determining whether said fluid flow rate is acceptable;

adding turbulence to said fluid flow and unclogging the cooling system via the turbulence if the determination is not acceptable; and flushing the cooling system with the pressurized fluid in a first flow direction through said cooling system.

2. The method of claim 1 wherein adding turbulence to the fluid flow comprises:

injecting air into said fluid flow at a higher pressure than said pressurized fluid to create the fluid flow.

3. The method of claim 1 further comprising: regulating a direction of the fluid flow through a flow control system.

4. The method of claim 3 wherein the entire flushing process is enabled by a cooling system flushing apparatus.

5. The method of claim 4 wherein the fluid is transmission fluid.

6. The method of claim 5 wherein no additional solvents are mixed with the transmission fluid to assist in dissolving or removing debris within the cooling system.

7. The method of claim 3 wherein the direction of the fluid flow is regulated by a check valve.

8. The method of claim 1 further comprising:

reversing the first flow direction of the pressurized fluid through the cooling system, pressurizing the fluid to create the fluid flow into the cooling system;

measuring the fluid flow rate to determine if the cooling system is clogged;

determining whether said fluid flow rate is acceptable;

adding turbulence to said fluid flow and unclogging the cooling system via the turbulence if the determination is not acceptable; and flushing the cooling system with the pressurized fluid in said reversed first flow direction through said cooling system.

9. The method of claim 8 wherein adding turbulence to the fluid flow comprises:

injecting air into said fluid flow at a higher pressure than said pressurized fluid to create the fluid flow.

10. The method of claim 8 further comprising: regulating a direction of the fluid flow through a flow control system.

11. The method of claim 10 wherein the entire flushing process is enabled by a cooling system flushing apparatus.

12. The method of claim 11 wherein the fluid is transmission fluid.

13. The method of claim 12 wherein no additional solvents are mixed with the transmission fluid to assist in dissolving or removing debris within the cooling system.

14. The method of claim 10 wherein the direction of the fluid flow is regulated by a check valve.

15. A cooling system flow testing and flushing device comprising:

means for pressurizing the fluid to create a fluid flow into the cooling system;

means for measuring a fluid flow rate to determine if the cooling system is clogged;

means for determining whether said fluid flow rate is acceptable;

means for adding turbulence to said fluid flow to unclog the cooling system via the turbulence if the determination is not acceptable; and means for flushing the cooling system with the pressurized fluid in a first flow direction through said cooling system.

16. The device of claim 15 further comprising:

means for reversing the first flow direction of the pressurized fluid through the cooling system, means for pressurizing the fluid in said reversed first flow direction to create the fluid flow into the cooling system;

means for measuring the fluid flow rate in said reversed first flow direction to determine if the cooling system is clogged;

means for detecting whether said fluid flow rate is acceptable in said reversed first flow direction;

means for adding turbulence to said fluid flow in said reversed first flow direction to unclog the cooling system via the turbulence if the determination is not acceptable; and means for flushing the cooling system with the pressurized fluid in said reversed first flow direction through said cooling system.

17. The device of claim 16 wherein the means for adding turbulence to the fluid flow comprises:

means for injecting air into said fluid flow.

18. The device of claim 17 further comprising: means for enabling a flushing process.

19. The device of claim 16 further comprising: means for regulating a direction of the fluid flow through a flow control system.

20. The device of claim 15 wherein the means for adding turbulence to the fluid flow comprises:

means for injecting air into said fluid flow.

21. The device of claim 20 further comprising: means for enabling a flushing process.

22. The device of claim 15 further comprising: means for regulating a direction of the fluid flow through a flow control system.

23. The apparatus of claim 19 wherein the fluid is transmission fluid.

24. The apparatus of claim 22 wherein the cooling system is a transmission oil cooler.

25. A cooling system flow testing and flushing apparatus comprising:

a fluid supply tank connected to a controlled air pressure system, said supply tank provides fluid to flush said cooling system;

a fluid supply line connected to the tank, said supply line feeds fluid to the cooling system;

a waste receptacle;

a fluid return line, said return line directs fluid from the cooling system to the waste receptacle;

a check valve coupled to said supply line, said valve regulating a direction of fluid flow;

a solenoid coupled to said supply line, said solenoid further connected to a controlled air pressure system wherein said solenoid pulsates air into the fluid to generate a fluid turbulence for loosening debris within the cooling system as the fluid flushes said cooling system;

a flow transducer attached to one of either the supply line or the return line, said transducer determines at least one fluid flow rate measurement; and a processor connected to said flow transducer and said solenoid, wherein the processor receives said at least one fluid flow rate measurement and is operable to control said solenoid.

* * * * *